(12) United States Patent
Keller et al.

(10) Patent No.: US 7,867,120 B2
(45) Date of Patent: Jan. 11, 2011

(54) LINEAR UNIT

(75) Inventors: Bernhard Keller, Wasserlosen (DE); Roland Hoherz, Kuetzberg (DE); Sven Anhut, Schweinfurt (DE)

(73) Assignee: Robert Bosch GmbH, Stuttgart (DE)

( * ) Notice: Subject to any disclaimer, the term of this patent is extended or adjusted under 35 U.S.C. 154(b) by 458 days.

(21) Appl. No.: 12/017,117

(22) Filed: Jan. 21, 2008

(65) Prior Publication Data

US 2008/0237389 A1    Oct. 2, 2008

(30) Foreign Application Priority Data

Mar. 30, 2007  (DE) .................. 20 2007 004 694 U

(51) Int. Cl.
*F16H 7/18* (2006.01)
(52) U.S. Cl. ...................... 474/149; 74/89.22
(58) Field of Classification Search ............... 474/144, 474/148, 149; 74/89.2, 89.22
See application file for complete search history.

(56) References Cited

U.S. PATENT DOCUMENTS

| | | | | |
|---|---|---|---|---|
| 3,224,366 A * | 12/1965 | Cunningham | ............ | 101/93.14 |
| 3,630,144 A * | 12/1971 | Hilpert et al. | ............... | 101/111 |
| 4,934,835 A * | 6/1990 | Albert | ......................... | 384/43 |
| 5,131,125 A * | 7/1992 | Coron | ......................... | 29/33 P |
| 5,186,545 A * | 2/1993 | Shirai | ............................ | 384/43 |
| 5,195,391 A * | 3/1993 | Barbat et al. | ............... | 74/89.22 |
| 5,234,386 A * | 8/1993 | Nagai et al. | ................. | 474/148 |
| 5,467,685 A * | 11/1995 | Hubl | .............................. | 92/88 |
| 5,517,872 A * | 5/1996 | Anada | ....................... | 74/89.21 |
| 5,598,043 A * | 1/1997 | Hirano et al. | ............ | 310/12.04 |
| 6,427,546 B2 * | 8/2002 | Alber | ......................... | 74/89.17 |
| 6,988,425 B2 * | 1/2006 | Nagai et al. | ................. | 74/89.32 |
| 2007/0234832 A1 * | 10/2007 | Iida | ............................ | 74/89.22 |

FOREIGN PATENT DOCUMENTS

| | | |
|---|---|---|
| DE | 37 43 577 | 7/1989 |
| DE | 90 11 413 | 10/1990 |
| DE | 41 18 627 | 1/1992 |
| EP | 0 139 115 | 5/1985 |
| EP | 0 935 296 | 10/1996 |
| EP | 1 057 624 A * | 12/2000 |

* cited by examiner

*Primary Examiner*—Thomas J. Brahan
(74) *Attorney, Agent, or Firm*—Michael J. Striker

(57) ABSTRACT

A linear unit having a main module unit and a drive unit in which the main module unit has a housing with a table part that a drive belt is able to move in the longitudinal direction; the drive belt is wound around a drive roller, which is connected to a drive unit, and around a freewheeling roller; and the drive belt is connected to the table part and is divided into an upper span and a lower span, and a guide element is situated on the base leg of the housing and is able to separate the upper span from the lower span.

12 Claims, 5 Drawing Sheets

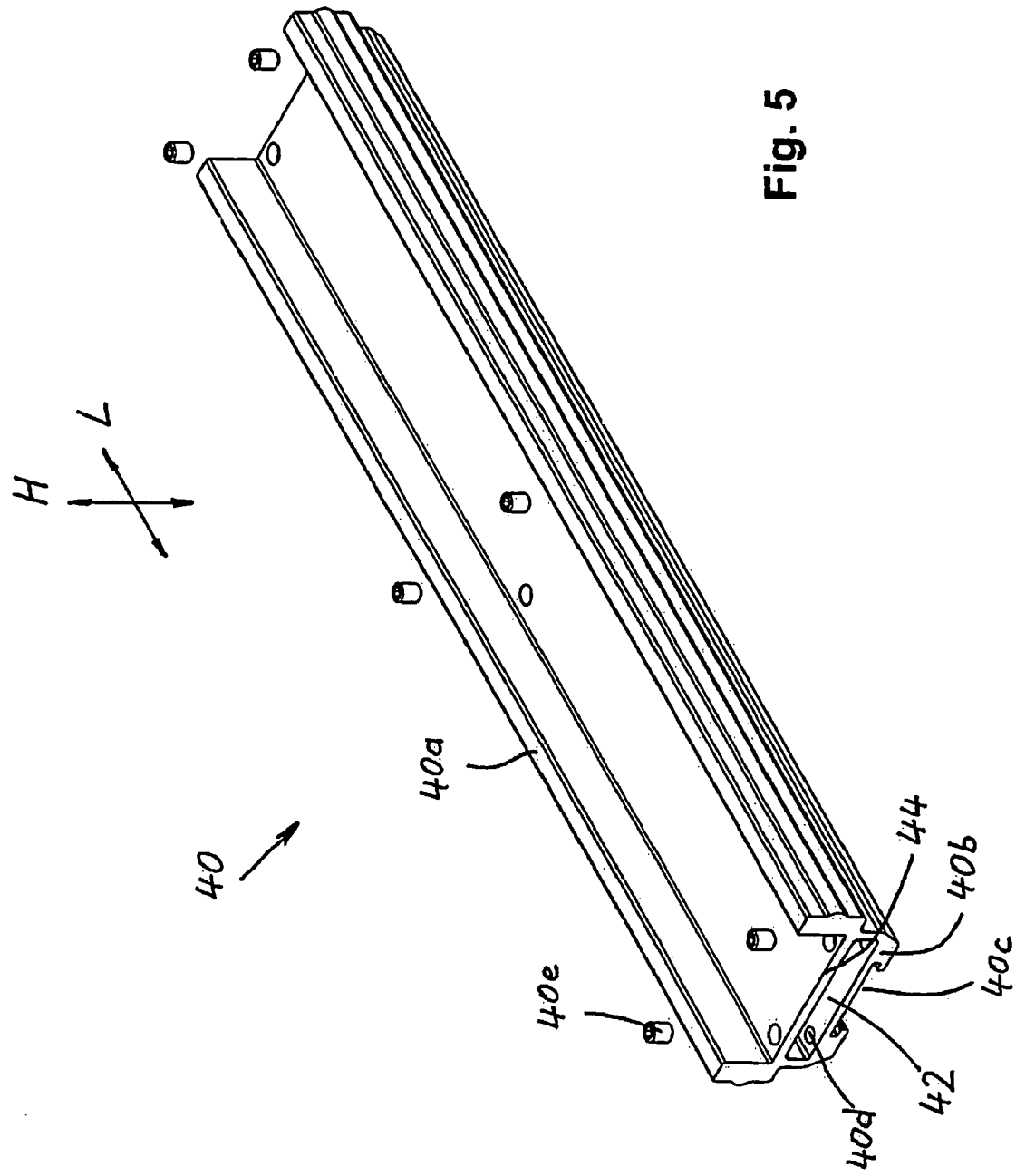

LINEAR UNIT

CROSS-REFERENCE TO A RELATED APPLICATION

The invention described and claimed hereinbelow is also described in German Patent Application DE 20 2007 004 694.4 filed on Mar. 30, 2007. This German Patent Application, whose subject matter is incorporated here by reference, provides the basis for a claim of priority of invention under 35 U.S.C. 119(a)-(d).

BACKGROUND OF THE INVENTION

The invention relates to a linear unit having a main module unit and a drive unit; the main module unit has a housing with a table part that a drive belt can move in a longitudinal direction; the drive belt is wound around a drive roller, which is connected to a drive unit, and around a freewheeling roller; the drive belt is attached to the table part and is divided into an upper and lower span.

A linear unit of this kind is known, for example, from DE 37 43 577 C1. In this linear unit, the freewheeling roller is supported on an end plate of the linear unit by means of tensioning screws that engage in threaded bores of the bearing shaft of the freewheeling roller. In addition, the drive belt is connected to the traveler at two fastening points, which are situated adjacent to the ends of the traveler oriented toward the freewheeling roller and oriented away from it. In this arrangement, it is disadvantageous that particularly with long lengths of the linear unit, the upper span and lower span of the drive belt can touch, which results in an increased wear and can also lead to a premature failure of the drive belt.

SUMMARY OF THE INVENTION

By contrast, the object of the present invention is to disclose a linear unit of the type mentioned at the beginning in which a damage to the drive belt is prevented.

This object is attained according to the invention by means of a linear unit of the type mentioned at the beginning in which a guide element is situated on the base leg of the housing and is able to separate the upper span from the lower span. Even with long lengths of the drive belt, in which sagging of the upper span cannot be avoided through belt tension, the guide element according to the invention prevents a contact between the upper span and the lower span.

In a section extending orthogonal to the movement direction, the guide element advantageously has an essentially U-shaped form with a base leg and two side legs.

The guide element can be embodied as integrally joined to the housing of the main module unit. It is particularly advantageous, however, if the guide element is embodied as a separate component, which makes it possible to eliminate an additional finishing of the housing.

The guide element is advantageously situated on the housing so that it can be moved longitudinally in relation to it and locked in position as needed. If one of the parts, i.e. the guide element or housing, has an undercut groove that engages around associated projections of the respective other part, i.e. the housing or guide element, then this makes it possible to achieve a stable guidance of the guide element in both the vertical direction and the lateral direction.

In order to adjust or eliminate an existing play between the housing and guide element, play-adjusting means can be provided, which are associated with the guide element, in particular its base leg.

If the guide element is embodied in the form of an extruded profile, then a reinforcing bridge piece extending parallel to the base leg can easily be provided, which delimits a chamber for accommodating the lower span and additionally contributes to the stabilization of the guide element.

In addition, the drive belt can be a toothed belt, which is likewise intrinsically known.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a perspective view of the guide element.

DESCRIPTION OF THE PREFERRED EMBODIMENTS

Figure 1:
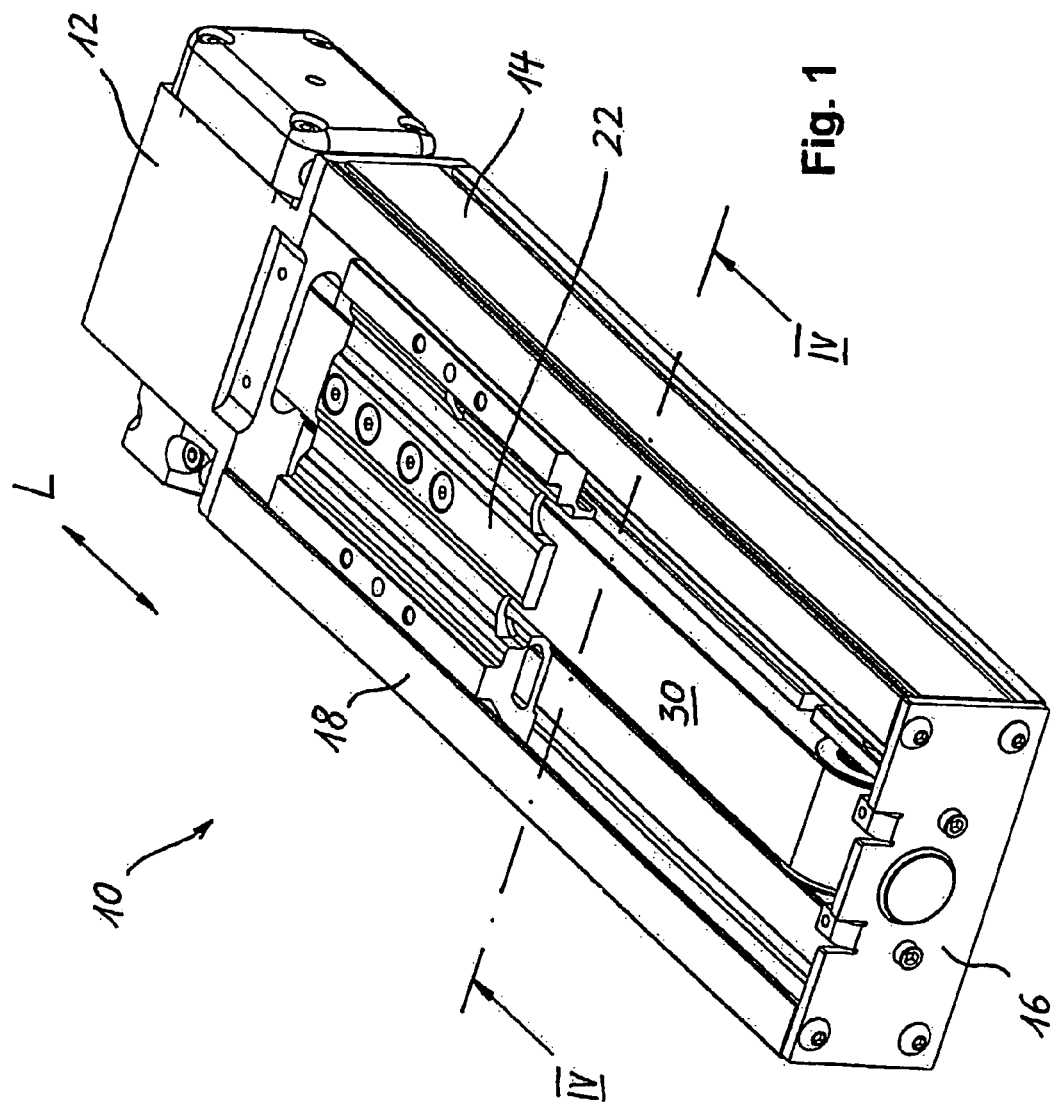
FIG. 1 is a perspective view of a linear unit according to the invention.

In FIG. 1, a linear unit according to the invention is labeled as a whole with the reference numeral 10. It includes a drive unit 12 and a main module unit 14. The inner structure of the main module unit 14 is shown in the end view according to FIG. 2.

The main module unit 14 has a housing 18 that is advantageously composed of an extruded profile with an essentially U-shaped cross-section. The base leg 18b of the U-shape of the housing 18 has two guide rails 20 mounted to it on which guide units 24 support a table part 22 so that it is able to slide in the longitudinal direction L of the linear unit 10. As is shown only in FIG. 2, the opening between the free ends of the side legs 18a of the U-shape of the housing 18 is covered over the entire length of the housing 18 by a cover plate 26.

Thereby only two longitudinal slots 28 remain, through which two fastening strips 22a of the table part 22 protrude. A component that is to be slid by means of the linear unit 10 can be attached to the table part 22 by means of these fastening strips 22a. The cover plate 26 is fastened to the drive unit 12 at one end and to the end plate 16 at the other.

Figure 3:
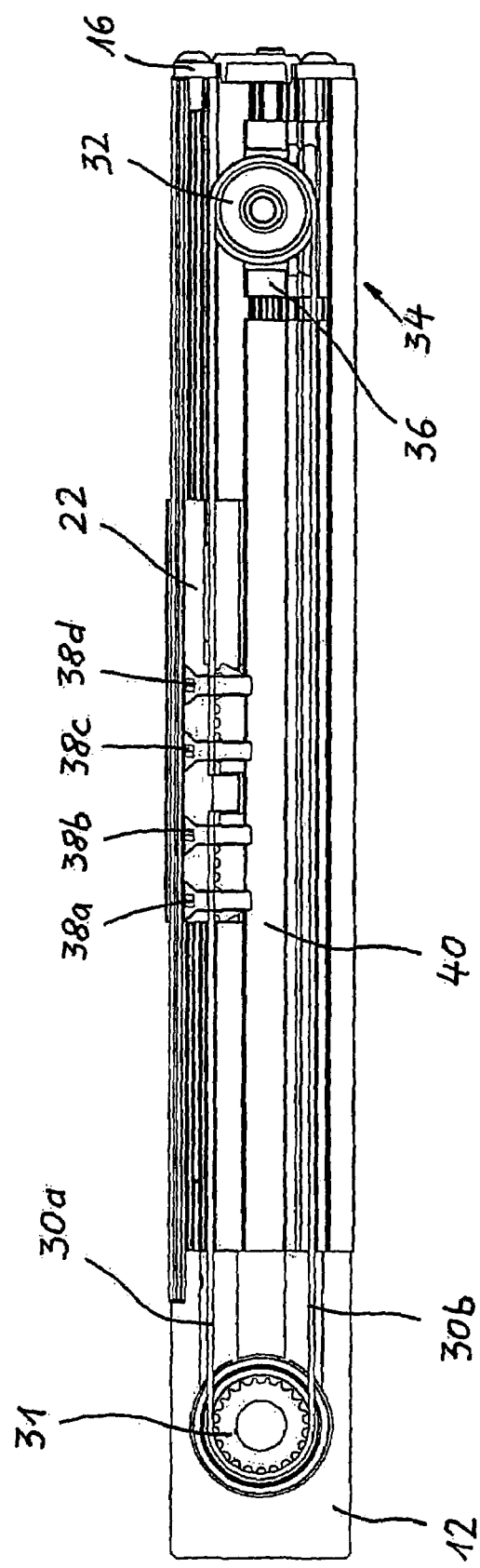
FIG. 3 is a sectional view of the linear unit according to the invention along the line III-III in FIG. 2.

As is particularly clear from FIG. 1 and FIG. 3, the linear unit 10 according to the invention is equipped with a belt drive. The drive belt 30 of the belt drive, which is closed into an endless loop, on the one hand winds around a driven roller 31 that is situated in the drive unit 12 and on the other hand, winds around a freewheeling roller 32, which is situated adjacent to the end plate 16. This arrangement divides the drive belt 30 into an upper span 30a and a lower span 30b.

As shown in FIG. 1, the drive belt 30 is fastened to the table part 22 at four fastening points 38a, 38b, 38c, and 38d.

In order to be able to tension the drive belt 30, which can be embodied, for example, in the form of a toothed belt, the freewheeling roller 32 is situated in a tensioning device 34.

Figure 2:
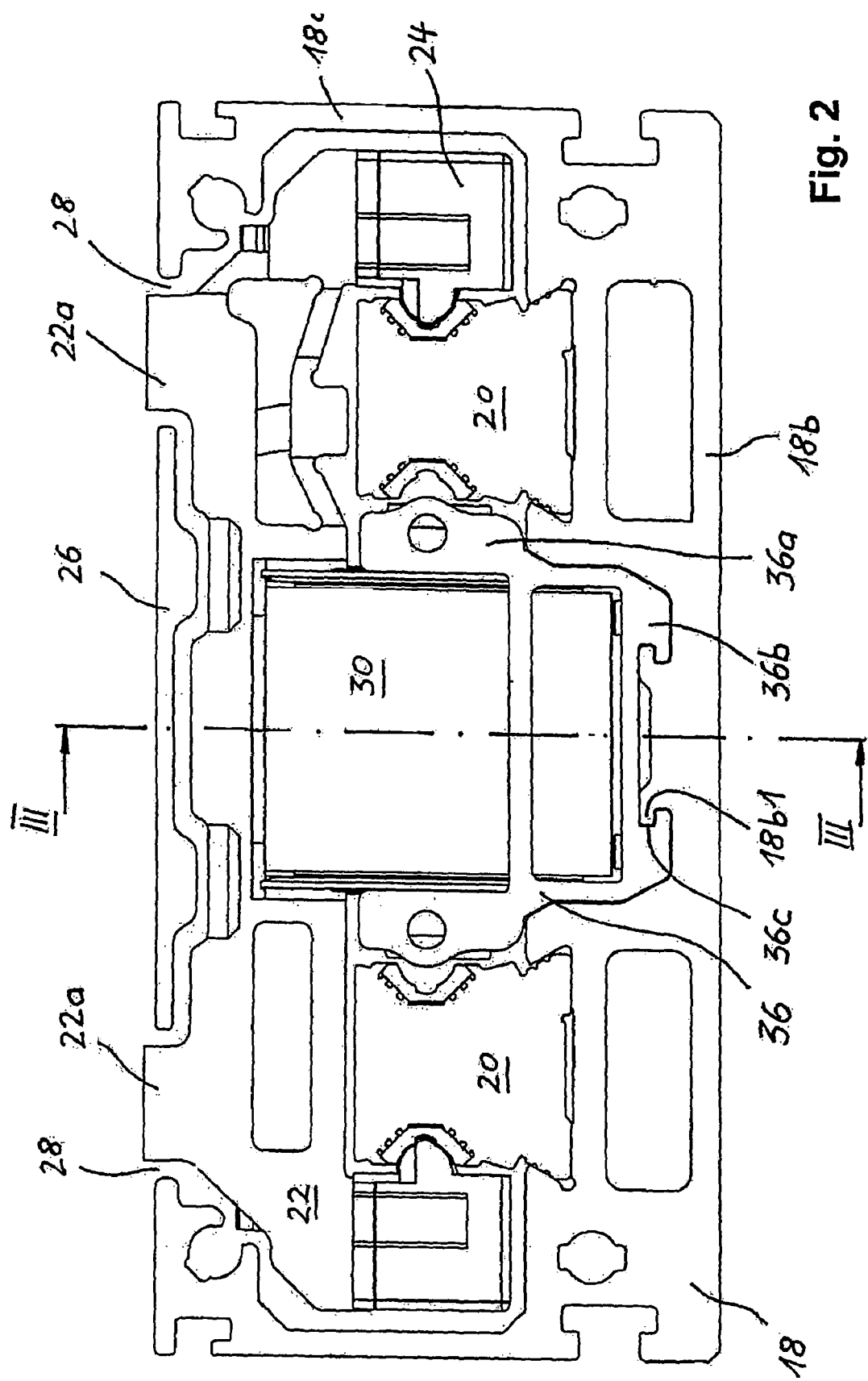
FIG. 2 is an end view of the linear unit according to FIG. 1, without an end plate.

As shown in FIG. 2, the tensioning device has an essentially U-shaped carriage 36 with two side legs 36a and a base leg 36b. On its base leg 36c, the carriage 36 is provided with an undercut groove 36c that engages around correspondingly embodied projections 18b1 of the base leg 18b of the housing 18.

As shown in FIG. 3, a guide element 40 is situated between the driven roller 31 and the freewheeling roller 32. The guide element 40 is an elongated extruded profile, which, in the exemplary embodiment shown, has the same cross section as the carriage 36 of the tensioning device 34 (FIGS. 4 and 5).

Figure 4:
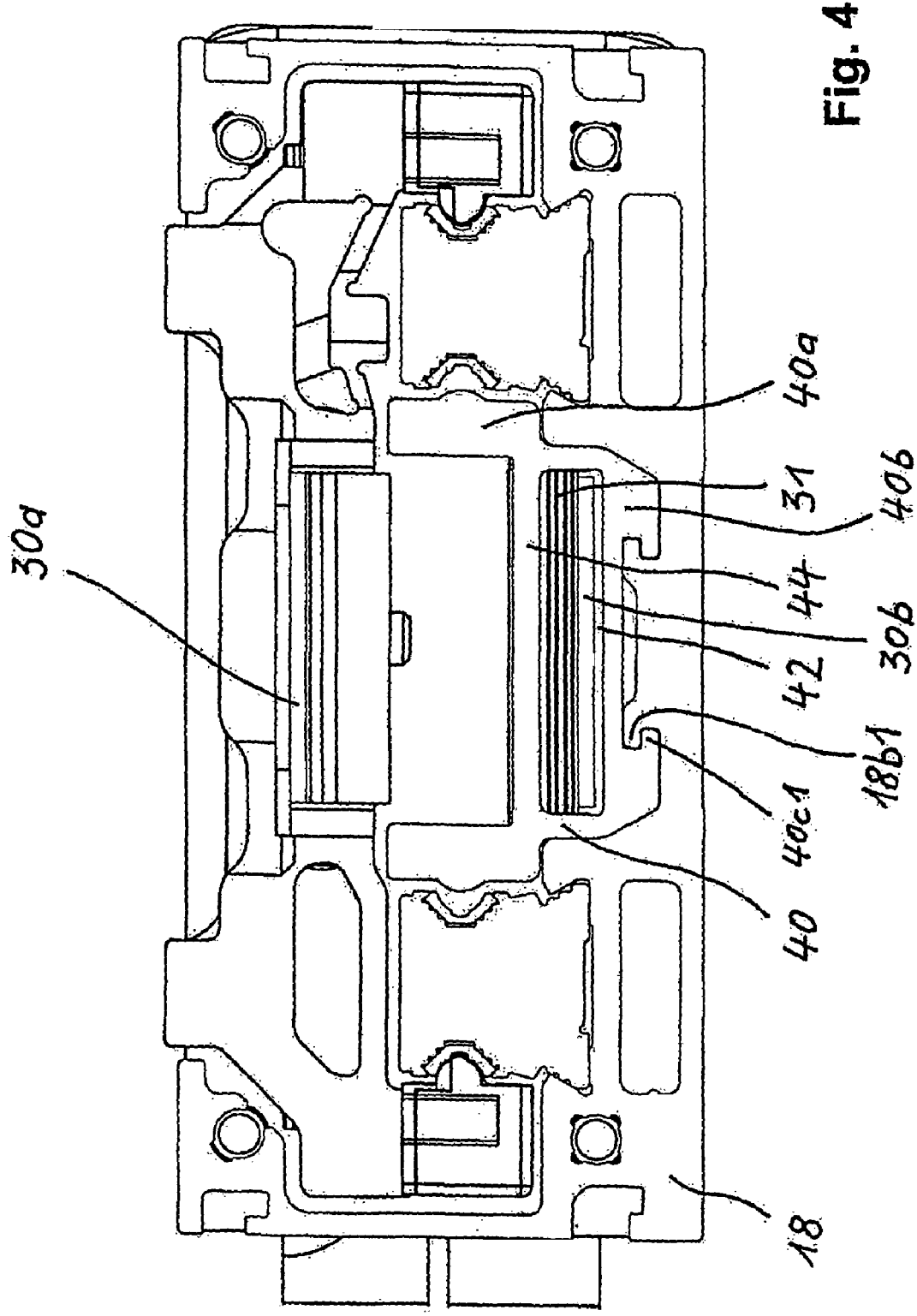
FIG. 4 is a sectional view of the linear unit according to the invention along the line IV-IV in FIG. 1.

As shown in FIGS. 4 and 5, the guide element 40 is U-shaped, with two side legs 40a and a base leg 40b that joins the two side legs. The base leg 40 is provided with a chamber 42 that extends over the entire length of the guide element 40 and is delimited by a reinforcing bridge piece 44 situated parallel to the base leg 40b.

The drawing also shows that the upper span 30a of the drive belt 30 travels on the side of the reinforcing bridge piece 44 oriented away from the chamber 42 while the lower span 30b of the drive belt 30 is accommodated in the chamber 42.

It should furthermore be noted that the reinforcing bridge piece 44 also contributes to stabilizing the form of the guide element 40.

In order to be able to reduce or eliminate an existing play between the guide element 40 and the housing 18, which play permits a desired mobility of the guide element 40 in the longitudinal direction L, threaded bores 40d extending in the vertical direction H are provided in the base leg 40b of the guide element 40 on both sides of the groove 40c. These bores 40d extend through the base leg 40b and set screws 40e can be screwed into them (FIG. 5).

If the lower end surfaces of the set screws 40e rest against the base leg 18b of the housing 18, then the projections 40c1 delimiting the groove 40c are pressed against the projections 18b1, thus reducing or eliminating an existing play between the guide element 40 and the housing 18.

It will be understood that each of the elements described above, or two or more together, may also find a useful application in other types of constructions differing from the type described above.

While the invention has been illustrated and described as embodied in a linear unit, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A linear unit, comprising:
   a main module unit;
   a drive unit, wherein said main module unit has a housing with a table part movable in a longitudinal direction by a drive belt that is wound around a drive roller connected to said drive unit and also around a free wheeling roller, wherein said drive belt is connected to said table part and divided into an upper span and a lower span;
   a tensioning device having an essentially U-shaped carriage, wherein the freewheeling roller is disposed in said tensioning device; and
   a guide element situated on a base leg of said housing and separating said upper span from said lower span, wherein said guide element is configured as a separate component, and wherein the guide element has a cross section that is the same as a cross section of the carriage of the tensioning device.

2. A linear unit as defined in claim 1, wherein said guide element is an elongated extruded profile.

3. A linear unit as defined in claim 1, wherein said guide element has a position which is adjustable relative to said housing in said longitudinal direction; and further comprising means for adjusting the position of said guide element.

4. A linear unit as defined in claim 3, wherein said means for adjusting the position of said guide element include at least one set screw supported on said housing.

5. A linear unit as defined in claim 4, wherein one of parts selected from the group consisting of said housing and said guide element has an undercut groove that engages around an associated projection of the other of said parts selected from the group consisting of said housing and said guide element.

6. A linear unit as defined in claim 1, wherein said guide element is guided on said housing.

7. A linear unit as defined in claim 1; and further comprising play-adjusting means for adjusting a play between said guide element and said housing.

8. A linear unit as defined in claim 1, wherein said guide element has a substantially U-shaped form in a section extending orthogonal to a movement direction.

9. A linear unit as defined in claim 8, wherein said guide element is configured as a guide element selected from the group consisting of a guide element guided by a base leg of a U-shape of said housing, a guide element provided with play adjusting means for adjusting a play between said guide element and said housing and associated with a base leg of the U-shape, and both.

10. A linear unit as defined in claim 9, wherein said guide element has a reinforcing bridge piece situated parallel to said base leg of said housing.

11. A linear unit as defined in claim 10, wherein said base leg and said reinforcing bridge piece form therebetween a chamber for accommodating said lower span of said drive belt.

12. A linear unit as defined in claim 1, wherein said drive belt is configured as a toothed belt.

* * * * *